(12) United States Patent
Bäuerle

(10) Patent No.: US 7,204,279 B2
(45) Date of Patent: Apr. 17, 2007

(54) FILLING-FIXTURE FOR AN INTAKE TUBE OF A FUEL TANK

(75) Inventor: Matthias Bäuerle, Wassertrüdingen (DE)

(73) Assignee: Alfmeier Prazision Ag Baugruppen und Systemlosungen (DE)

( * ) Notice: Subject to any disclaimer, the term of this patent is extended or adjusted under 35 U.S.C. 154(b) by 343 days.

(21) Appl. No.: 10/885,487

(22) Filed: Jul. 6, 2004

(65) Prior Publication Data

US 2005/0039820 A1 Feb. 24, 2005

(30) Foreign Application Priority Data

Jul. 9, 2003 (DE) .............................. 103 31 073

(51) Int. Cl.
*B65B 1/04* (2006.01)
*B65B 3/00* (2006.01)

(52) U.S. Cl. ...................... 141/350; 141/348; 141/349; 220/86.2

(58) Field of Classification Search ................ 141/285, 141/286, 301, 312, 348–350; 220/86.2, DIG. 33; 137/587–589
See application file for complete search history.

(56) References Cited

U.S. PATENT DOCUMENTS

| | | | |
|---|---|---|---|
| 4,759,458 A | 7/1988 | Fischer | |
| 4,816,045 A | 3/1989 | Szlaga et al. | |
| 4,977,936 A | 12/1990 | Thompson et al. | |
| 5,215,110 A | 6/1993 | Benjey | |
| 5,246,132 A | 9/1993 | Muth et al. | |
| 5,322,100 A * | 6/1994 | Buechler et al. | 141/312 |
| 5,343,905 A | 9/1994 | Gryc et al. | |
| 5,431,199 A | 7/1995 | Benjay et al. | |
| 5,462,100 A | 10/1995 | Covert et al. | |
| 5,524,662 A | 6/1996 | Benjey et al. | |
| 5,660,206 A | 8/1997 | Neal et al. | |
| 5,740,842 A | 4/1998 | Maier et al. | |

(Continued)

FOREIGN PATENT DOCUMENTS

DE 9218560 11/1994

(Continued)

OTHER PUBLICATIONS

German Office Action in related foreign case dated Apr. 1, 2004, from German Patent Office, with English translation, citing EP 0311756, DE 9218560, and EP 1068948 on p. 2 of Office Action.

*Primary Examiner*—Timothy L. Maust
(74) *Attorney, Agent, or Firm*—Dority & Manning, P.A.

(57) ABSTRACT

A vehicle tank includes an intake tube, on the end of which is placed a filling-fixture containing an automatic tank closure. The filling-fixture is made of one piece with the intake tube. The automatic tank closure is integrated in an insert. The filling-fixture forms a recess on its upper end into which the insert can be placed. A fissure joint is sealed with the aid of a sealing element between the filling-fixture and the insert and the securement of the insert in its recess is assured by a retaining flange. The flange is circumferentially connected in a radially outlying area with the filling-fixture and the flange extends so far radially inward that it covers the fissure joint and an inward extending area of the upper side of the insert.

20 Claims, 4 Drawing Sheets

U.S. PATENT DOCUMENTS

| | | |
|---|---|---|
| 5,921,424 A | 7/1999 | Palvolgyi |
| 5,931,206 A | 8/1999 | Simdon et al. |
| 5,950,692 A | 9/1999 | Georgs et al. |
| 5,960,833 A | 10/1999 | Der Manuelian |
| 5,988,238 A | 11/1999 | Palvolgyi |
| 6,019,348 A * | 2/2000 | Powell ................ 251/144 |
| 6,026,853 A | 2/2000 | Osterbrink |
| 6,026,855 A | 2/2000 | Jackson et al. |
| 6,029,719 A | 2/2000 | Hor et al. |
| 6,058,963 A | 5/2000 | Enge et al. |
| 6,095,207 A | 8/2000 | Enders |
| 6,105,612 A | 8/2000 | Schaar |
| 6,932,100 B2 * | 8/2005 | Martin et al. ............ 137/15.18 |
| 2003/0198768 A1 | 10/2003 | Delbarre |

FOREIGN PATENT DOCUMENTS

| | | |
|---|---|---|
| EP | 0311756 | 4/1989 |
| EP | 1068948 A2 | 1/2001 |

* cited by examiner

FILLING-FIXTURE FOR AN INTAKE TUBE OF A FUEL TANK

FIELD OF THE INVENTION

The invention concerns a vehicle tank equipped with an intake tube, the upper section of which forms a filling-fixture. In the filling-fixture is placed an automatic tank closure.

BACKGROUND OF THE INVENTION

In typical fuel tanks, the filling-fixture, that is, the highest part of the intake tube and that particular part which carries the tank closure, is closed by various connection devices placed thereon. Conventional connection variants include, for example, hose clamps, pinch-rings, or the like. Sealing between the connection of the intake tube, the filling support and the tank closure, as a rule, is effected by one or more O-rings.

Future lawfully imposed permeation rates, where the intake tube is concerned, cannot be fulfilled by the above described, conventional filling-fixtures. The permeation rate for a single filling-fixture, which is affixed to the intake tube by one of the above connections with O-rings, lies at approximately 5 mg/24 h solely for sealing the connection. Estimated limiting values for a complete filling-fixture, including an automatic tank closure show allowable maximum values of permeation rates of 10 mg/24 h for Low Emission Vehicles, Stage 2 (LEV-II) and 5 mg/24 hr for Partially Zero Emission Vehicles (PZEV). The connection of the filling-fixture to the intake tube, to fulfill PZEV demands would lead to a situation where no additional permeation could possible occur in the tank system. At the present time, this is not technically possible to achieve.

BRIEF SUMMARY OF THE INVENTION

The invention is directed to a vehicle tank with an automatic tank closure, which possesses low permeation rates while being simple to manufacture and install.

In accord with an aspect of the invention, the filling-fixture is constructed as one piece with the intake tube, whereby, the automatic tank closure is integrated into one insert, which lies in a receiver of the filling-fixture and is secured therein. The receiver is placed on the upper end of the filling-fixture. A fissure thus created between the filling-fixture and the insert is made tight by a sealing element.

Due to the one piece construction of the filling-fixture and the intake tube, the connection piece which had been formerly required therebetween is now eliminated. This connection piece had to be fashioned in an expensive manner to achieve easy mounting and also had to be properly gasketed. The thereby caused restriction to total permeation is removed, due to the invented free and continuous wall of the intake tube. This clear passage is optionally made for maximum permeation and the intake tube is made, for example, of polyethylene (PE), within which an inner automatic permeation closure is embedded. This automatic closure itself, that is, the insert which contains that closure, can also be optimized for minimally restricted permeation.

Thus, there remains as a single connection zone, that binding located between the intake tube and the insert. The insert lies in a receiving space provided for it, whereby the fissure remaining between the filling-fixture and the insert is sealed off via a sealing element, which can be more or less complex according to the demands of permeation requirements. By securing the insert in the receiving zone, a reliable holder and an effective seal can be guaranteed over the life of the vehicle tank.

If, as a sealing element, an O-ring is selected, then this contributes to an economical sealing of the present opening. O-rings are especially low cost as a mass produced, commercial ware. In order to supply even additional sealing capabilities, it is possible to install a plurality of O-rings.

The securement of the insert in its prepared receiving zone is carried out in at least one preferred embodiment via a retaining flange, which is bound to the filling-fixture in a radially outward location and which extends itself so far inward, that it caps the fissure and a radially extending upper surface of the insert. In this manner, which is simple from the standpoints of both manufacture and mounting, the insert is now securely installed within the receiving zone of the filling-fixture and fixed in a predetermined position.

The retaining flange can be connected to the insertion in various ways. One of these possibilities is that the retaining flange on its underside which is immediately adjacent to the filling-fixture, possesses an axially parallel apron, which positions itself about the outer circumference of top of the filling-fixture. This permits a simple and economical securement of the retaining flange at the top of the filling-fixture by the affixing the apron to the retaining flange by welding or screwing.

Advantageously in another embodiment, latches are freely cut in the apron. These latches, after the placement of the flange on the top of the filling-fixture, snap into prepared recesses in the outer circumference of the filling-fixture, whereby the retaining flange becomes firmly anchored in it caplike position.

In yet another embodiment of the fastening variants, the retaining flange is welded to the filling-fixture. This leads to a mechanical securement but also provides an additional sealing for the structural fissure, i.e., the separative division between the upper wall of the filling-fixture and the installed insert. For a small sealing requirement, no separate O-rings are necessary alongside the welding seam.

The wall of a modem vehicle tank as well as its intake tube is usually constructed of PE or, in some cases, can be fabricated from a mixture of plastic materials. In such a case, an inner layer of material is formed to serve as a blocking agent against fuel leakage and coated thereon is an outer layer of PE. Such an intake tube can be "plastic welded" without difficulty to a retaining flange of PE. If the insert is of a permeate optimized material, such as polyoxymethylene (POM) or polyamide (PA), which is not weldable with PE, then by a manufacturing variable of the invention wherein, if two unweldable parts must be bound together, then a welding flange of a such a material that is weldable with the one part can be installed. In the case of an intake tube with an outer PE layer, then the welding flange would also be of PE.

In such a case, in which the retaining flange and the filling-fixture were not welded to one another, then for the opening and the shutting of the tank closure, an activation element for this purpose is provided and penetrates radially between the upperside of the insert and the sealing element of the separative fissure. The activation element continues its radial extension through the insert to the outside, thus being operator accessible. In this way, an additional permeate impairing break-through in the intake tube is avoided.

If, in another design, the retaining flange and the filling-fixture are welded together, then the activation element is run to the outside above the retaining flange, at least above the welding seam on the retaining flange, and penetrates radially through the insert. In this way, in the tank system, up to the permeation restricting welding seam, no additional permeation position is present.

BRIEF DESCRIPTION OF THE DRAWINGS

The invention is now explained in greater detail with the aid of embodiments shown in drawings below. There is shown in.

DETAILED DESCRIPTION OF THE DRAWINGS

Figure 1:
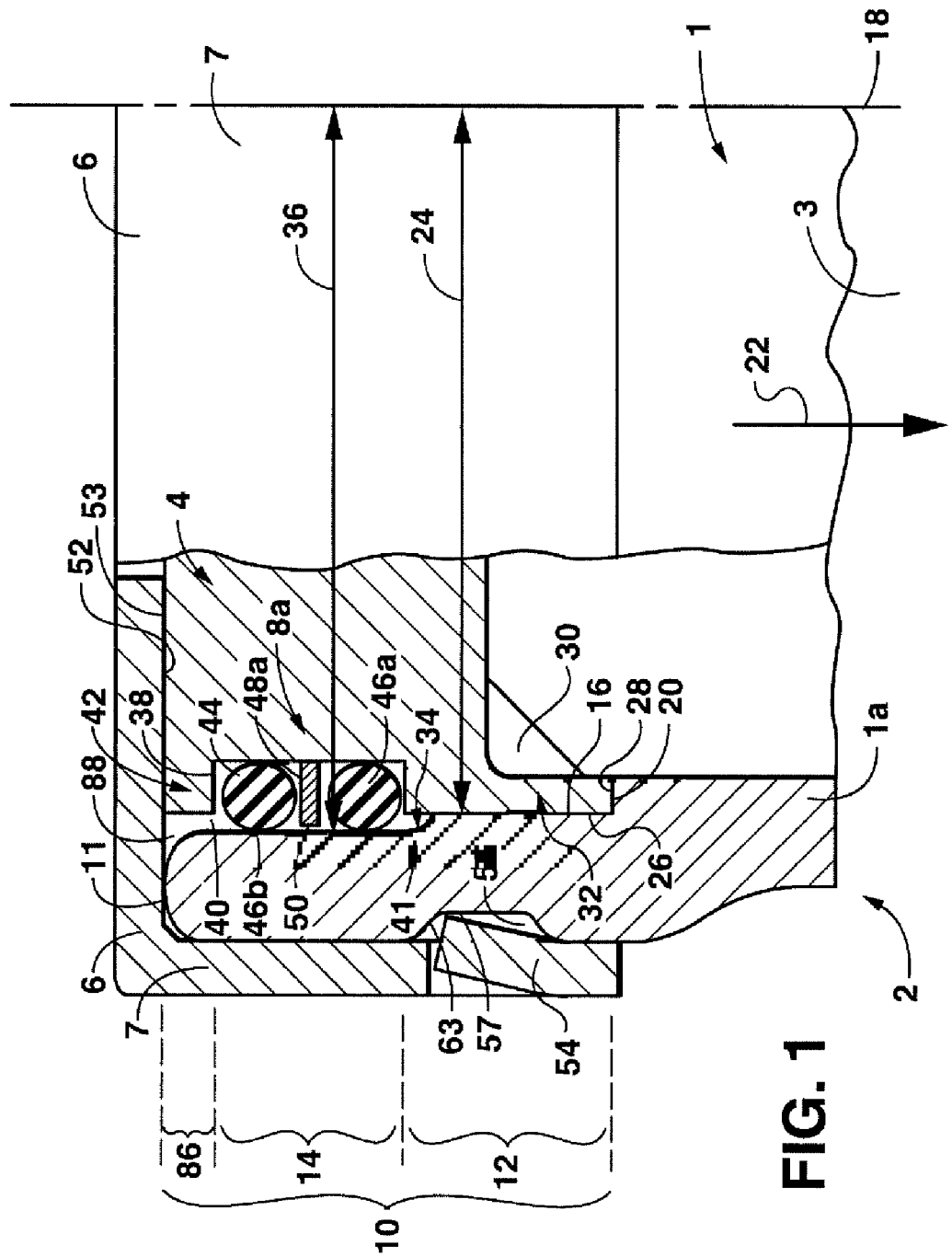
FIG. 1 a schematic sectional presentation of a first embodiment of the invention, particularly showing an insert which incorporates an automatic tank closure and is held by shape-bonding to the retaining flange of the filling-fixture.

Detailed reference will now be made to the drawings in which examples embodying the present invention are shown. The detailed description uses numerical and letter designations to refer to features in the drawings. Like or similar descriptions in the drawings and description have been used to refer to like or similar parts of the invention.

The drawings and detailed description provide a full and detailed written description of the invention, and of the manner and process of making and using it, so as to enable one skilled in the art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

FIG. 1 shows an essentially rotationally-symmetrical end of an intake tube 2, to which a filling-fixture 1 is molded in one-piece construction. The filling-fixture 1 includes a filling-fixture element 1a. In the filling-fixture 1 is placed an insert 4, which seals the interior 3 of the tank and the intake tube 2. The insert 4 is fastened to the intake tube 2 by an annular retaining flange 6 with an integrally molded-on rimlike apron 7. Between the insert 4 and the filling-fixture element 1a, a sealing element 8a is placed.

In order to enable the filling of the tank, the insert 4 is provided with an automatic tank closure therein. The automatic tank closure, for the sake of clarity and to improve the overview, is omitted from all the figures.

The upper end section 10 of the filling-fixture 1 has an exact fitting zone 12, which extends itself from below the exposed inner face 11 of the retaining flange 6 toward the tank interior 3. Immediately above (with reference to FIG. 1) and axially aligned with this fitting zone 12 is to be found the sealing zone 14. In the fitting zone 12, the inner side of the filling-fixture element 1a, follows the design of a hollow, cylindrically shaped contact surface 16, whereby the centerline axis 18 thereof is identical with the centerline axis of the upper end 10 of the filling-fixture 1 and the insert 4. At the lower end of the contacting surface 16 is formed by cutback, an inside, circumferential detent shoulder 20 which horizontally extends itself radially inward. As to the cross-section of the insert 4, besides the described round shape, other forms, such as for example, a rectangular shape with sharply rounded off edges could be considered In a case of assembly of the tank, the insert 4, together with the sealants 8a are inserted in the direction of the arrow 22 into the filling-fixture 1. The outside diameter 24 of the insert 4 is so dimensioned that the insert 4 with its cylindrical shaped, outer contacting surface 26 lies precisely against the cylindrical inner surface 16 or has a slight excess of diameter. This acts to provide a centering of the insert 4 within the filling-fixture 1, thereby occupying a desired position.

In end position, which is illustrated in FIG. 1 (following the complete placement of the insert 4 and the sealing means 8a in the filling-fixture 1), the extended end 28 of the insert 4 is arrested by the shoulder 20 of wall surface 16. The insert 4 is clamped thereagainst by the superimposed retaining flange 6.

Several stabilization webs 30 apportioned around the circumference of insert 4 reinforce a collar 32 against inward deformation. This collar 32 is molded as one piece with the radially outward wall of the insert 4. The outer surface of the collar 32 is smooth and its surface 26 lies against surface 16 of the inner wall of the filling-fixture element 1a.

The sealing zone 14 is separated from the fitting zone 12 by a transition area 34 which extends inward in a somewhat conical fashion. The inner wall of the filling-fixture element 1a forms in the sealing zone 14 a cylindrical sealing surface 38, the inner radius 36 of which is somewhat greater than the outer radius 24 of the insert 4. In this way a circumferential separative opening 40 is created between the insert 4 and the intake tube 2, and the opening 40 extends itself axially. The sealing surface 38 and the contacting surface 16 thus form, essentially, a receptor 41 into which the insert 4 can be placed.

An annular groove 42 is made in the insert 4 opposite to the sealing surface 38 of the intake tube 2. A bottom surface of the groove 42 serves as a sealing surface 44. In the annular groove are placed two O-rings 46a, 46b. The radial dimensional distance between the sealing surfaces 38 and 44 is dimensioned in such a way that the O-rings 46a, 46b are so pressed together in the radial direction of the assembly as to assure the best possible sealing action.

The two O-rings 46a, 46b are separated from one another by a spacer washer 48a, which has its inside circumference pressing against the sealing surface 44. In order to bring the sealing assembly into the annular groove 42, the spacer washer 48a is radially slit at one place on its circumference. The radial breadth of the spacer washer 48a is slightly less than the distance between the sealing surfaces 38 and 44. Thus, between the spacer washer 48a and the sealing surface 38, a fissure 50 is formed. In this way, assurance is given, that the centering of the insert 4 within the filling-fixture 1 is guaranteed only by the fitting section 12 and not affected by the spacer washer 48a. The spacer washer 48a so acts, that each of the two O-rings 46a, 46b are made to lie in a desired section of the annular groove 42, whereby they also locate themselves in the predetermined spaces of the sealing surfaces 38 and 44. Beyond this, the washer 48a prevents the O-rings 46a, 46b from interfering with one another by overlap or crowding when the insert 4 is pushed into the filling-fixture 1.

By centralizing the insert 4 into the filling-fixture 1, assurance is given, with the aid of the fitting zone 12, that the radial distance of separation between the sealing surfaces 38 and 44 is constant around the entire circumference of the filling-fixture 1. The O-rings 46a, 46b, on this account, are equally compressed around the entire circumference of the filling-fixture element 1a, which is an advantage leading to a equivalent circumferential sealing action. The fitting zone 12 provides, above all, that by the mentioned over-dimensioning of the insert 4, in regard to the filling-fixture 1, acts as an additional sealing measure.

After the inset—in the direction 22—of the insert 4 into the filling-fixture 1, in the same direction, the retaining flange 6 is pushed onto the filling-fixture 1. In the presented end position, the retaining flange 6 pushes with its underside 52 against the upperside 53 of the insert 4 in a fixing manner such that the insert 4 cannot release itself from the filling-fixture element 1a in a direction opposite to the arrow 22. In order to hold the retaining flange 6 in the shown end position, apportioned over the entire circumference of the caplike apron 7 of the flange 6, are to be found bent latches 54. These latches 54 are free cut out of the material of the flange apron 7, and after the mounting of the retaining flange 6 into its end position, the latches 54 are pressed into complementary recesses 56 in the outside of the intake tube 2. Because of the inherent plastic deformation of the material of the apron 7, these as well as the retaining flange 6 are made of metal. The pushing in of the banding latches 54 cause an axial as well as a rotational blocking of movement of the retaining flange 6 on the filling-fixture 1.

The inner radius of the apron 7 is custom-fit to the outside radius of the filling-fixture element 1a, so that all parts are locked together and free of play or wobbling.

Figure 2:
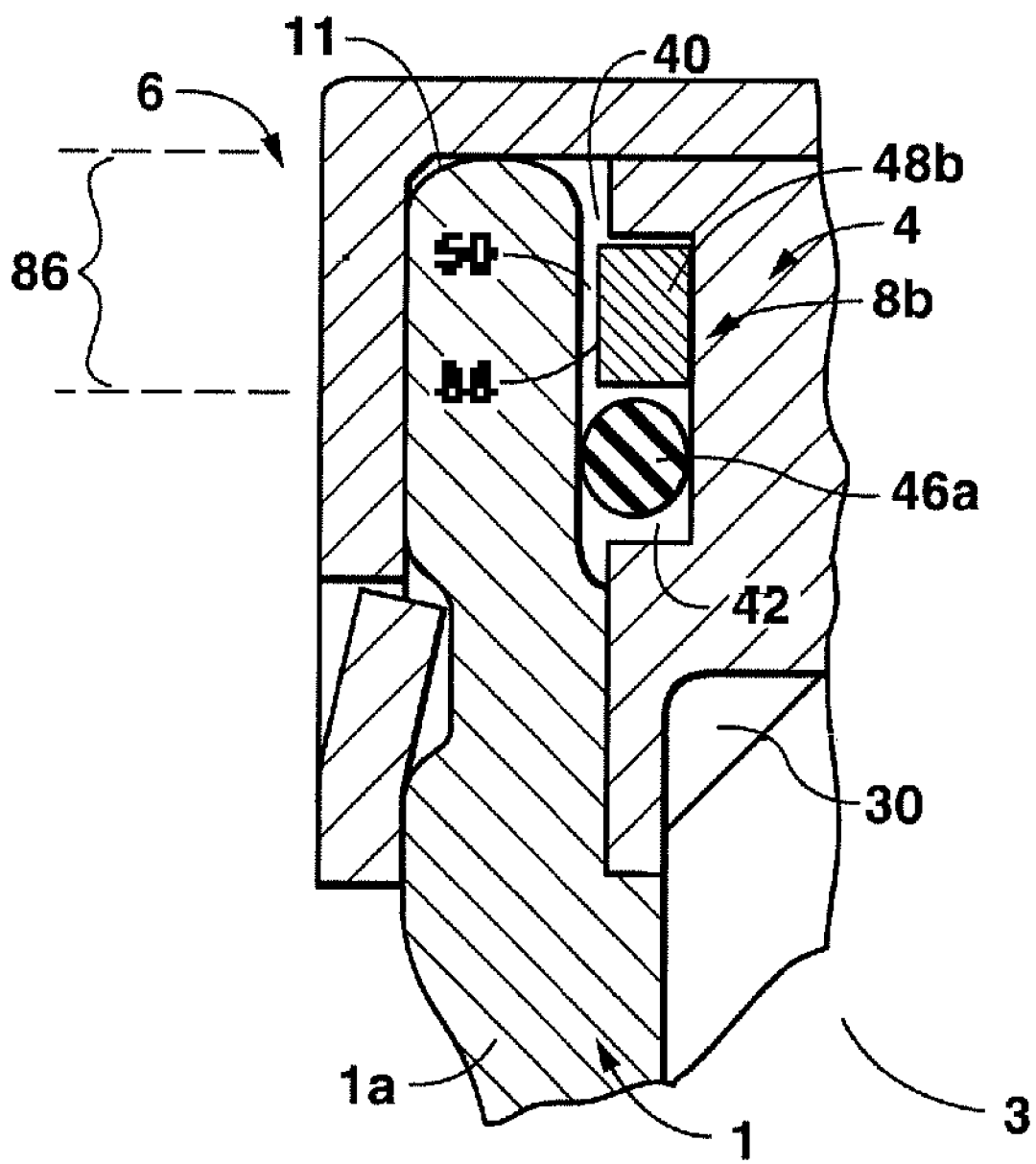
FIG. 2 a second embodiment, presented in the same manner as FIG. 1, wherein a sealing means, which differs from that of FIG. 1, is placed between the insert and the intake tube.

FIG. 2 shows a filling-fixture 1 with an alternative sealing arrangement 8b. For such cases, in which the connection between the insert 4 and the filling-fixture 1 calls for lesser sealing requirements than are seen in FIG. 1, this suffices to seal off the opening 40 with only a single O-ring 46a. In the annular groove 42, on this account, only one O-ring 46a can be placed. Contrary to the case of FIG. 1, this O-ring 46a is kept in the predetermined sealing place by a spacer-washer 48b, which is enlarged in the axial direction. All of the remaining components of the filling-fixture 1 are identical to FIG. 1. This permits that even with the fulfillment of different sealing means on the tank system, down to the spacer washers 48a, 48b, the same components can be used. This is advantageous in planning for the finished product. Especially, the annular groove 42 is the same in both cases, on which account, only a single insert 4 need be made.

Figure 3:
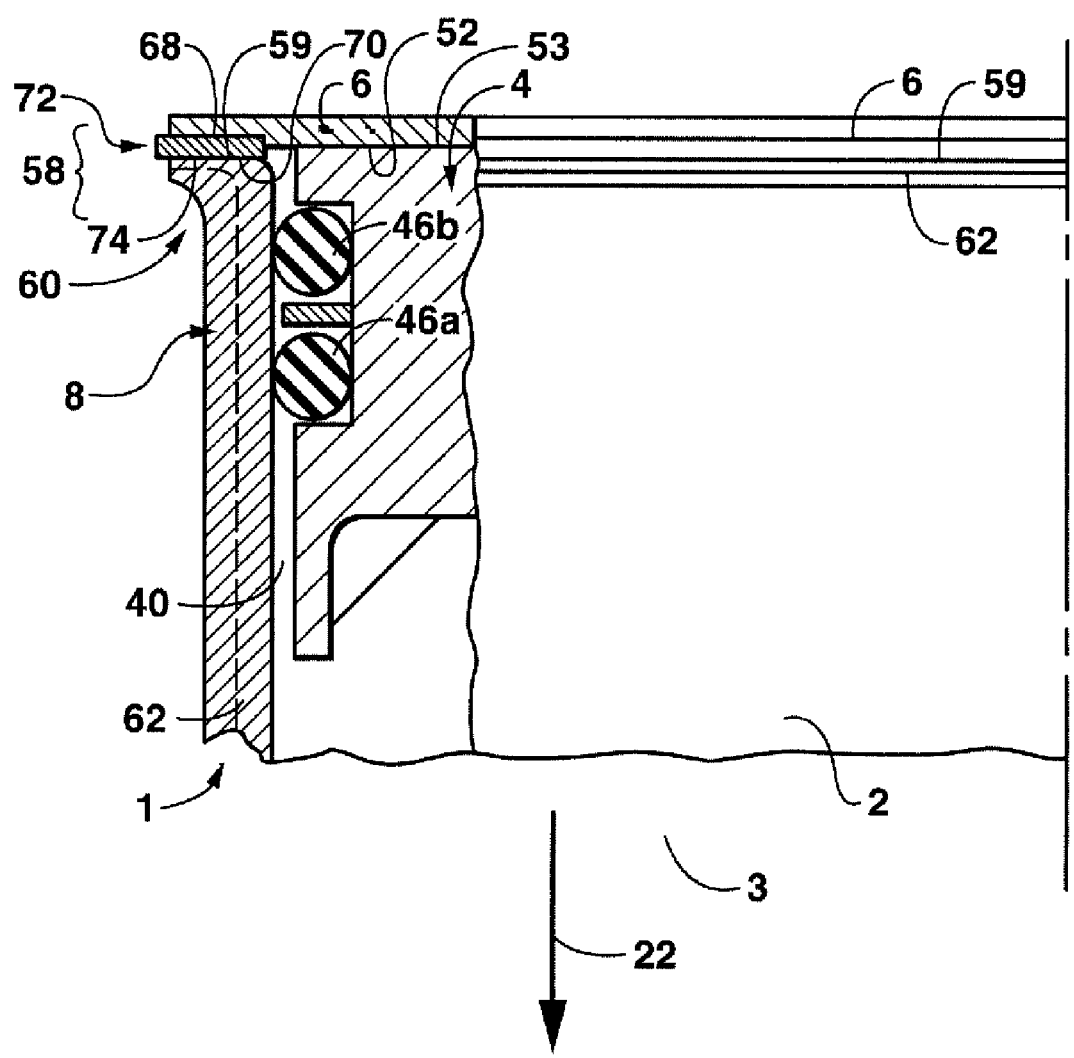
FIG. 3 a third embodiment, presented in the same manner as FIG. 1, wherein the fastening of the insert is achieved by a retaining flange welded to the intake tube; and in FIG. 4 a fourth embodiment, presented in the same manner as FIG. 1, wherein an activation element, which co-acts with the automatic tank closure, is located above an area reserved for sealing means.

In FIG. 3, the insert 4 is affixed in a welding zone 58 to the filling-fixture 1 in an alternative arrangement, namely with a retaining flange 6 lacking an apron 7. In order to create on the filling-fixture 1 a contact surface for welding, which is large enough to provide a mechanically stable and possibly even a permeation resisting welding seam, the upper, circumferential edge area 60 of the filling-fixture element 1a is bent radially outward. In the wall of the entire motor vehicle tank and the filling-fixture element 1a of PE-material, is installed a permeation tight blockage layer 62. Further, this blocking layer 62 is somewhat widened in the manner of a funnel on its upper end 60. The annular retaining flange 6, in the embodiment here shown, is firmly connected on its underside 52 to the upperside 53 of the insert 4. In the embodiment shown in FIG. 3, the filling-fixture 1 is constructed without a tight fit section, i.e. fitting zone 12. The centering of the insert 4 in the filling-fixture 1 is carried out, lacking the fitting zone 12, during the mounting operation, that is, the centering is accomplished e.g. by the O-ring seals 46a, 46b.

In the presented embodiment the retaining flange 6 cannot be directly welded to the filling-fixture element 1a, since the retaining flange 6 is of POM and the filling-fixture element 1a is made of PE. For this reason, on the retaining flange 6 is a fastened a welding flange 68. For the connection of these two parts, e.g. the two-component technology (2K) is made use of. The welding flange 68 is, in turn, welded onto the intake tube 2. The welding can, for example, be accomplished by a friction welding procedure. In this aspect of the invention, the entire underside 70 of the welding flange 68 is flat and also melted together with the receiving surface 59. It is also possible that a torus shaped welding seam in the radially outer edge zone 72 of the welding flange 68 can be made. In a case where an appropriate choice of material has been made for the retaining flange 6 and the intake tube 2, the welding flange 68 can be omitted and both parts united in the form of the above mentioned welding connection.

The retaining flange 6 can also be molded as one piece onto the insert 4, in a manner not shown, instead of being set thereon as a separate component. This is of value, since then the fastening of the retaining flange 6 on the insert 4 becomes superfluous, in case of the non-presence of the fitting area 12. Due to the absence of the contacting surface 26, the insert 4 finds no obstructions in the direction of the arrow 22, and would, accordingly, slide always further into filling-fixture 1. The support is achieved by the retaining flange 6 which is solidly bound to the insert 4.

The welding area 58 always fulfills the sealing role in order to block the output of damaging material from the interior of the tank space 3 through the constructive fissure 40. Where small sealing requirements are in play, it is eliminated as sealing elements. A permeation in the welding zone 58 (FIG. 3) is possible, namely, only through the non-permeable base material of the filling-fixture 1 in the opening 74 between the blocking layer 62 (FIG. 3) and the welding flange 68, on which account this opening 74 is held to be as small as possible.

Figure 4:
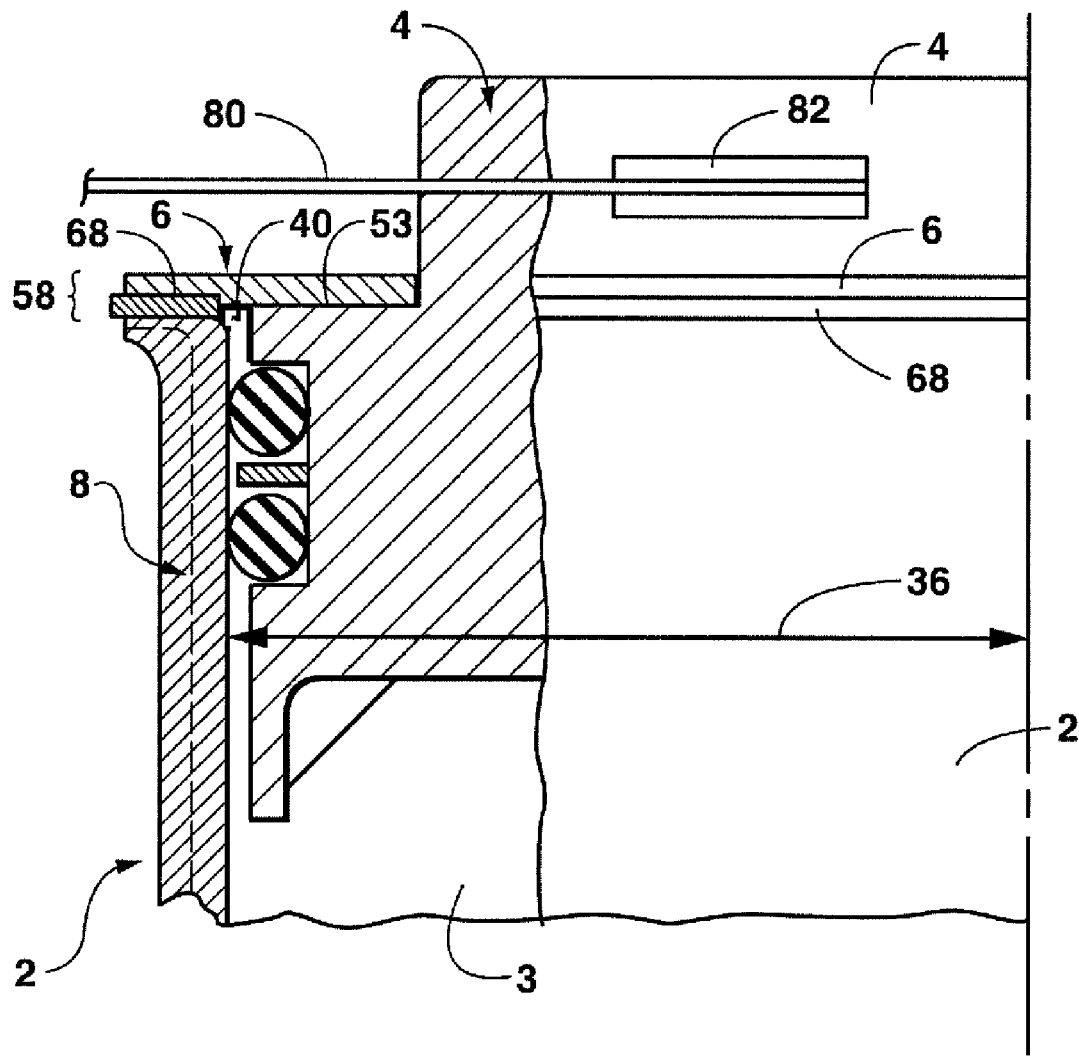

The automatic tank closure which is to be found embedded within the insert 4, which makes the interior space 3 of the tank open to the outside, for example, for filling with fuel from a hand held nozzle (not shown), must be maintenance accessible for opening or closing. For this purpose an activation element 80 serves, which can be, for example, a push/pull rod or a Bowden cable—possibly also a gear type connection by a rack and pinion, or a snake or the like. In the case of the embodiment shown in FIG. 4, the insert 4 rises axially above the plane level of the retaining flange 6. In the extended part of the insert 4, a through-opening 82 is made, which is penetrated by the activation element 80.

The opening 82 is placed above the sealing means 8 and the welding zone 58, so that it does not communicate with the constructive opening 40. On this account, between the activation element 80 and the opening 82, no additional sealing expense need be met in regard to permeation, since the interior space 3 of the tank is further closed by the sealing means 8 (and the welding zone 58) and is, hence, permeation-tight shut.

In the exemplary embodiments of FIGS. 1, 2, a penetrative opening for the activation element 80 can be made in the zone 86 (FIG. 1), that is, the zone between the sealing means 8 and the inside face 11 of the retaining flange 6. Again, in this case, no additional permeation location is to be expected, since between the upper end 88 of the constructive opening 40 and the outside environment, no sealing means would be encountered. The penetration (or boring) would accordingly lie outside of the permeation sealing space.

While preferred embodiments have been shown and described, those skilled in the art will recognize that other changes and modifications may be made to the foregoing embodiments without departing from the scope and spirit of the invention. For example, specific shapes and dimensions of various elements of the illustrated embodiments and materials used for those elements may be altered to suit particular applications and industry regulations. It is intended to claim all such changes and modifications as fall within the scope of the appended claims and their equivalents. Moreover, references herein to "top," "bottom," "outer," and "inner" structures, elements and geometries and the file are intended solely for purposes of provided an enabling disclosure and in no way suggest limitations regarding aperture orientation of invention embodiments or equivalents thereof.

The invention claimed is:

1. A filling-fixture for an intake tube of a fuel tank, the filling-fixture having an automatic tank closure therein, the filling-fixture comprising:
    a filling-fixture element made of one piece with the intake tube;
    an insert having the tank closure integrated therein, the insert disposed in a recess formed in the filling-fixture;
    a sealing element disposed between the filling-fixture element and the insert to seal a fissure therebetween; and
    a retaining flange connected with its radially outward part with the filling-fixture element such that the flange covers the fissure and an area extending radially inward of the insert.

2. A filling-fixture in accord with claim 1, wherein the sealing element is an O-ring.

3. A filling-fixture in accord with claim 1, wherein the retaining flange defines an axially extending apron affixed to an outer circumference of the filling-fixture element.

4. A filling-fixture in accord with claim 3, further comprising latches formed from sections of the apron, the latches extending radially inward into respective recesses on the outer circumferential surface of the filling-fixture element.

5. A filling-fixture in accord with claim 1, wherein the retaining flange is welded to the filling-fixture element.

6. A filling-fixture in accord with claim 5, wherein the retaining flange is welded to an exposed end face of the filling-fixture element at an underside of the flange facing the filling-fixture element.

7. A filling-fixture in accord with claim 5, wherein the retaining flange and the filling-fixture are made of mutually weldable materials.

8. A filling-fixture in accord with claim 5, wherein the retaining flange and the filling-fixture are made of non-mutually weldable material and further comprising a welding flange weldable to one of the retaining flange and the filling-fixture element and fixed to the mutually other part.

9. A filling-fixture in accord with claim 8, wherein the filling-fixture element is PE or has an outer layer of PE and the retaining flange is polyoxymethylene (POM) or polyamide (PA), and the welding flange is PE.

10. A filling-fixture in accord with claim 1, further comprising an activation element for opening and closing the fuel tank closure, the activation element penetrating the filling-fixture in an upperside of the insert above the sealing element of the fissure, the activation element extending radially outwards.

11. A filling-fixture in accord with claim 10, wherein the activation element penetrates radially outward above the retaining flange from within the insert.

12. A filling-fixture with an automatic tank closure for a fuel tank, the filling-fixture comprising:
    a filling-fixture element integrally formed with an intake tube, the filling-fixture element and the intake tube defining a receptor area therebetween;
    an insert defining a groove therein disposed in the receptor area;
    a sealing element disposed in the groove of the insert adjacent the filling-fixture element to seal a fissure formed between the insert and the filling-fixture element; and
    a retaining flange affixed to the filling-fixture to seal the sealing element in the groove about the filling-fixture element, the retaining flange extending from the filling-fixture element in a direction of an intake tube opening.

13. The filling-fixture as in claim 12, wherein the filling-fixture element and the intake tube are weldable together.

14. The filling-fixture as in claim 12, further comprising a weldable flange weldable to the filling-fixture element or the retaining flange to affix the filling-fixture element and the retaining flange together.

15. The filling-fixture as in claim 12, further comprising a latch formed from the retaining flange, the latch configured to yield radially in a direction of axial insertion and return to an original position urged against a portion of the filling-fixture element.

16. The filling-fixture as in claim 15, wherein the portion of the filling-fixture element defines a cut-out for the latch, the cut-out configured to resist removal of the latch in an axial direction.

17. The filling-fixture as in claim 12, further comprising an activation element for the tank closure, the activation element disposed in a through-opening of the insert spaced apart from the fissure to reduce permeation from the fuel tank.

18. A filling-fixture having an automatic tank closure for closing a filler tube, the filing-fixture comprising:
    a filling-fixture element formed as one-piece with an intake tube, the filling-fixture element and the intake tube defining a receptor area therebetween;
    an insert disposed in the receptor area, the insert defining a collar configured to prevent deformation of the filling-fixture element;
    a sealing element disposed between the filling-fixture element and the insert to seal a fissure between the filling-fixture element and the insert; and
    a retaining flange affixed to the filling-fixture to seal the sealing element about the filling-fixture element, the retaining flange depending from proximate the filling-fixture element in a direction of an opening of the intake tube.

19. The filling-fixture as in claim 18, wherein the filling-fixture element is weldable, the collar configured to prevent the filling-fixture element from deforming in a direction of the insert when the retaining flange is affixed over the filling-fixture element and at least a portion of the insert.

20. The filling-fixture element as in claim 18, further comprising a spacer disposed between the insert and the filling-fixture element configured to retain the sealing element between the insert and the filling-fixture element.

* * * * *